Figure 1:
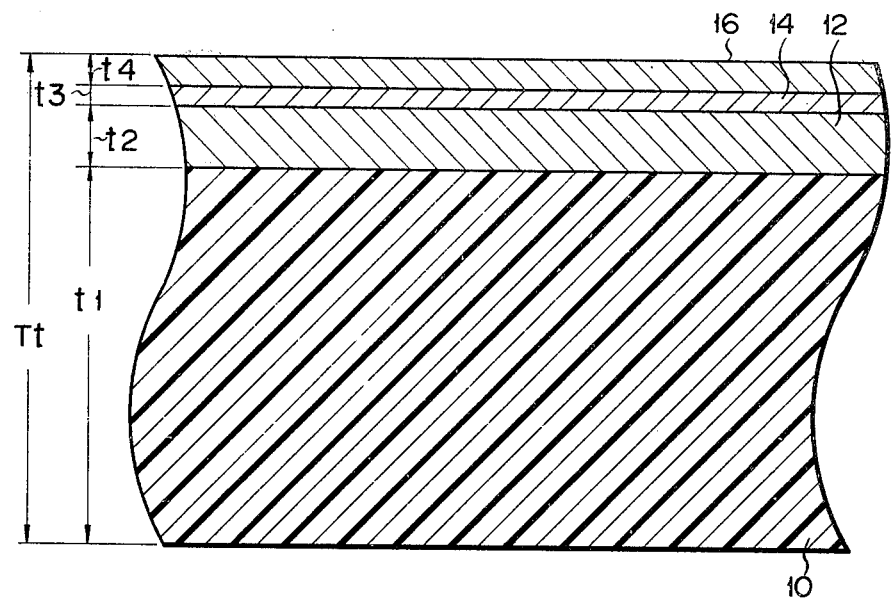

United States Patent [19]

Hanaoka

[11] 4,410,583
[45] Oct. 18, 1983

[54] FERROMAGNETIC RECORDING MEDIUM

[75] Inventor: Naohiro Hanaoka, Hachioji, Japan

[73] Assignee: Olympus Optical Co., Ltd., Tokyo, Japan

[21] Appl. No.: 244,807

[22] Filed: Mar. 17, 1981

[30] Foreign Application Priority Data

Mar. 21, 1980 [JP] Japan ................................. 55-35815

[51] Int. Cl.³ .......................... G11B 5/70; B32B 7/02
[52] U.S. Cl. .................................... 428/213; 360/134; 360/135; 360/136; 427/128; 427/131; 427/132; 428/215; 428/216; 428/336; 428/692; 428/694; 428/695; 428/900; 428/611; 428/928
[58] Field of Search ............... 428/694, 695, 900, 692, 428/693, 611, 928, 213, 215, 216, 336; 252/62.54; 360/134-136; 427/131, 132, 128

[56] References Cited

U.S. PATENT DOCUMENTS 4,172,171 10/1979 Suzuki et al. ....................... 428/216
4,200,678 4/1980 Pister et al. ......................... 428/900
4,237,189 12/1980 Deffeyes ............................. 428/900

FOREIGN PATENT DOCUMENTS 2461936 7/1976 Fed. Rep. of Germany .
2716356 10/1977 Fed. Rep. of Germany .
2731049 1/1979 Fed. Rep. of Germany ...... 427/131
37-2218 5/1962 Japan .
47-26883 7/1972 Japan .................................. 427/131
51-6703 1/1976 Japan .................................. 427/131
54-143113 11/1979 Japan .

Primary Examiner—Ellis P. Robinson
Attorney, Agent, or Firm—Frishauf, Holtz, Goodman & Woodward

[57] ABSTRACT

A magnetic recording medium having a base, a first magnetic layer formed on the base, and a second magnetic layer formed on the first magnetic layer. The magnetic recording medium further comprises a third magnetic layer which does not contain a binder formed on the second magnetic layer. A third magnetic layer containing a binder has a predetermined thickness to cover surface roughness of the second magnetic layer and functions as a protection layer for the second magnetic layer.

93 Claims, 4 Drawing Figures

FERROMAGNETIC RECORDING MEDIUM

The present invention relates to improvements of a magnetic recording medium such as a magnetic tape.

A typical example of the magnetic recording medium is a magnetic tape for recording a musical source and the like, for example, a cassette tape. For this type of magnetic tape, it has been desired that a uniform and large level recording is performed over a wide frequency range. Approaches, which have been proposed to meet such a requirement, are Japanese Patent Publication No. 2218/62 and Japanese Patent Disclosure No. 143113/79. The magnetic recording medium disclosed in said publications has a dual layered configuration consisting of a low coercive force magnetic layer formed on a base layer and a high coericve force magnetic layer layered on the former layer. With this configuration, a high output level in the short wave range (high frequency range) is attained with little deterioration of the MOL (utility maximum output level) in the long wave range (mid bass range).

In coating the surface layer of high coercive force, or the second magnetic layer together with binder, the present coating technique can not make the second magnetic layer extremely thin. Since the thickness of the tape must be fixed over the entire length of the tape, the tape base, therefore, must be thinned by the thickness of the second magnetic layer coating. This fact is undesirable for a long play tape of the C-120 type which must be thin, from a mechanical strength of view. When the second magnetic layer (made of Co, Fe, Ni or the like) is deposited without binder, that is, the second magnetic layer is deposited on the first magnetic layer by the sputtering or evaporation depositing process, the second magnetic layer may be formed extremely thin. In this case, however, for practical use a protective layer must be formed on the second magnetic layer to improve the running performance of the tape, corrosion resistance, wear resistance and the like. The protective layer should have a thickness (normally 0.3 to 0.5 $\mu$m) which is thicker than the second magnetic layer, in order to provide a satisfactory function. When organic macromolecule material is used for the protecting layer, a spacing loss is obtained which is disadvantageous. Specifically, the second magnetic layer and the gap edge of the magnetic head are separated by the thickness of the protective layer, so that the high frequency range output is reduced as the protective layer becomes thicker. An experiment shows that, when a sinusoidal wave of 15 KHz is recorded with 2.4 cm/sec of tape speed, the level loss is about 7 dB for 0.2 $\mu$m spacing. When the thickness of the protective layer is too thin (for example, 0.3 $\mu$m or less), the corrosion resistance and the wear resistance are deteriorated and the proximity of the magnetic layer surface to a conductor produces an electrostatic noise and curling or cupping is possibly produced in the layer.

Accordingly, an object of the present invention is to provide a magnetic recording medium with improved mechanical and magnetic characteristics which is free from deterioration of corrosion and wear resistances with a minimum of the spacing loss.

To achieve the above object, the magnetic recording medium according to the invention comprises a base member or film, a first magnetic layer formed on the film, a second layer formed on the first magnetic layer, and a third magnetic layer formed on the second layer. A thin film-containing a fine grain alloy such as Fe and Co is used for the second magnetic layer. Said second magnetic layer includes a metal element (Fe, Co, Ni) of the group VIII of the Periodic Table or an alloy including a metal element selected from the group VIII. A magnetic layer of fine grain alloy such as $\gamma$—$Fe_2O_3$ including organic binder is used for the third magnetic layer. The third magnetic layer coated with the organic binder has better mechanical characteristics, for example, the wear resistance, than the second magnetic layer. When the first magnetic layer is a thick film (for example, 1 $\mu$m) of relatively low energy such as $\gamma$—$Fe_2O_3$ and the second magnetic layer is an alloy thin film (e.g. 0.3 $\mu$m) of high energy, satisfactorily large MOL is obtained for both mid bass and high ranges in a well balanced manner. Further, since the second magnetic layer is coated with the third magnetic layer, the mechanical characteristics such as the wear resistance are excellent. Additionally, since the third magnetic layer may be ferromagnetic in substance and properly thin in thickness (for example, 0.5 $\mu$m), the spacing loss is small.

Furthermore by properly combining the materials and the thickness of the first to third magnetic layers, the magnetic recording medium may be thin over its entire without losing the advantages. In addition the magnitudes of the recording bias and erasing magnetic fields may be kept compatible with those of the conventional recording medium of the iron oxide type. This implies that when the recording medium of the present invention is applied for music tape, the record/playback characteristic can be improved by using the conventional tape recorder as it is. In other words, as long as the recording medium of the present invention is used, there is no need for a tape recorder using a special tape selector position for a metal cassette tape which has recently been used.

Figure 2:
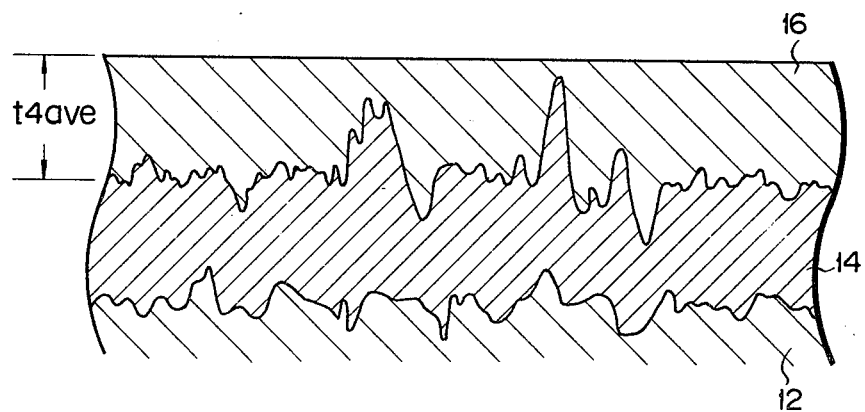
Figure 4:
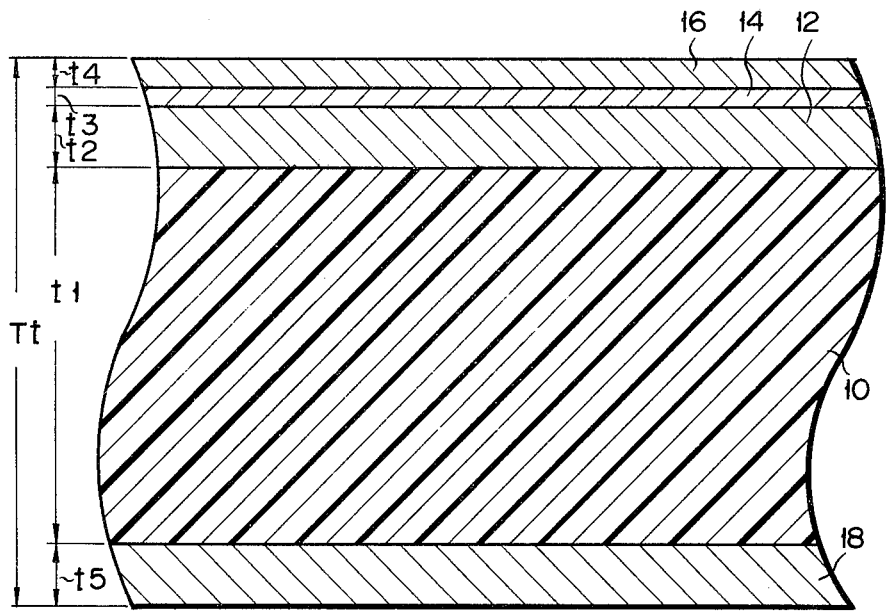
Figure 3:
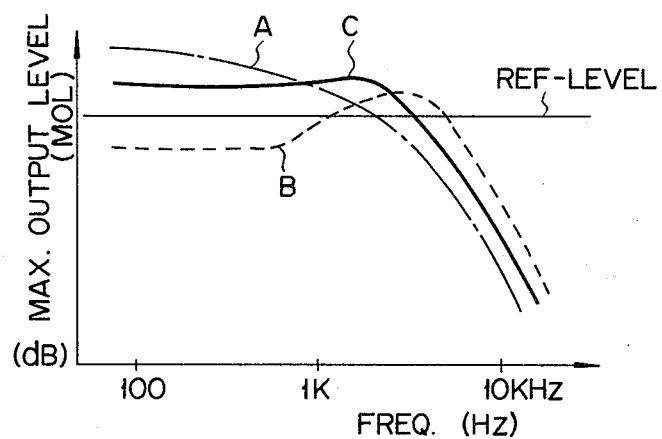

Other objects and advantages of the present invention will be apparent from the following description in connection with the accompanying drawings, in which:

FIG. 1 is a cross sectional view of a part of an embodiment of a magnetic recording medium according to the present invention;

FIG. 2 exaggeratively illustrates a cross section of a part of the upper magnetic layers in FIG. 1;

FIG. 3 is a graphical representation to illustrate how the magnetic characteristic is improved by the magnetic recording medium constructed as shown in FIG. 1; and FIG. 4 is a partial cross section of a modification of the magnetic recording medium shown in FIG. 1.

Before proceeding with the description of the embodiments of the invention, it will expressly be understood that like reference symbols are used to designate like portions throughout the drawings for simplicity of illustration and that the components designated by like reference symbols may easily be replaced with each other or one another with minor change thereof by a skilled person in the art. An embodiment of a magnetic recording medium according to the invention will be described.

A specific embodiment of a magnetic recording medium according to the invention will be described with reference to the accompanying drawings. An example when the magnetic recording medium according to the present invention is applied for a magnetic tape used in a microcassette or a compact cassette, is illustrated in FIG. 1. A first magnetic layer 12 containing mainly acicular powder of low coercive force type material (about 500 to 600 Oe) such as γ—Fe$_2$O$_3$ (gamma hematite) and organic binder is coated over a base film (base) 10 made of polyethylene terephthalate, polyester or the like. Then, the base film 10 coated with the first magnetic layer 12 is subjected to a calendering process. In the next step metal magnetic material such as Co (cobalt) is obliquely vapor-deposited on the first magnetic layer 12 up to a given thickness at an incident angle of about 60° with respect to a normal of the first magnetic layer 12. As a result of the vapor deposition, a second magnetic layer 14 is formed on the first magnetic layer 12. The coercive force of the second magnetic layer 14 for example, may be 500 to 600 Oe. The formation of the second magnetic layer may be conducted by any other suitable means such as the sputtering. A third magnetic layer 16 containing magnetic powder, for example, γ—Fe$_2$O$_3$, together with organic binder is then coated over the second magnetic layer 14. Subsequently, the surface of the third magnetic layer 16 is subjected to a calendering process. The forming method of the magnetic layers 12, 14 and 16 may be a suitable one well known to those skilled in the art. The method of forming the layers 12 and 16 is disclosed in "MAGNETIC RECORDING" in Science and Industry, Edited by C. B. Pear, Jr. Reinhold Publishing Corp., New York, pp58 to 84. The method of forming the layer 14 may be the one disclosed in Japanese patent application No. 176578/80 filed by the applicant of the present patent application or in U.S. Pat. No. 3,342,632 (G. Bate et al).

For about 9 μm of the total thickness Tt of the magnetic tape constructed as shown in FIG. 1, the thickness t1 of the base film 10 is about 7.2 μm; the thickness t2 of the first magnetic layer 12 is about 1.0 μm; the thickness t3 of the second magnetic layer 14 is about 0.3 μm; and the thickness t4 of the third magnetic layer 16 is about 0.5 μm. The above example, which is directed for the application of the compact cassette (Philips type) of the C-120, selects the thickness of the base film 10 in accordance with the magnetic layers 12 to 16 so that the total thickness of the tape is always about 9 μm. The magnetic tape thus constructed exhibits at the magnetic surface an insulating characteristic like an insulating material to avoid producing electrostatic noise. In addition, it does not curl or cup and its tape running characteristic is good. An additional advantage of the magnetic tape of the present embodiment is that, since the magnetic energy of the second magnetic layer 14 is large, the total thickness of the magnetic layers 12 to 16, i.e. t2+t3+t4, may easily be thin.

The third magnetic layer 16 is used for a protection layer for the second magnetic layer 14 and its thickness t4 is selected within a range from about 0.3 μm to about 1.0 μm. When the thickness t4 is less than 0.3 μm, unsatisfactory performance of the recording tape is obtained at the present stage in our trial experiment. The reason for this will be described referring to FIG. 2. The surface of the second magnetic layer 14 formed on the first magnetic layer 12 by vapor deposition, sputtering or the like is considerably ragged when microscopically observed in the order of 0.1 μm. From this, it is concluded that the average thickness t4$_{ave}$ of the third magnetic layer 16 must be thick enough to cover the surface roughness of the second magnetic layer 14. Otherwise, the third magnetic layer 16 unsatisfactorily functions as the protective layer for the second magnetic layer. Consequently, the average thickness t4$_{ave}$, or the given thickness, of the third magnetic layer 16 should be thicker than approximately 0.3 μm.

When the thickness t4 of the third magnetic layer 16 is too thick (e.g. 1.0 μm or more), the interval between the second magnetic layer 14 and the gap of a recording head expands, failing to take full advantage of the useful feature of the second magnetic layer 14 which is its high energy and good high frequency range characteristics. When the total thickness Tt is restricted to a fixed value, if the thickness of the third magnetic layer 16 is too thick, the base film 10 must be correspondingly thinner and therefore the mechanical strength of the tape is deteriorated. Consequently, in the above example, the thickness t4 of the third magnetic layer 16 should be selected to be within approximately 0.3 μm to 1.0 μm, preferably 0.3 μm to 0.5 μm. When the thickness of the base film 10 may be selected to be sufficiently thick, as in the case of the cassette tape of the C-90 or C-60 type, the thickness of the magnetic layers 12, 14 and 16 may be selected without severe restriction.

FIG. 3 is a graph for comparatively illustrating the experimental results of the magnetic tape with the construction shown in FIG. 1 and the prior magnetic tape. In the measurement of the experiment, the tape recorder used was of the 3-head type and tape speed was 2.4 cm/sec. In FIG. 3, curve A represents a frequency response of the magnetic tape coated with γ—Fe$_2$O$_3$ by a binder. Curve B represents a frequency response of a three-layered tape which is formed by alternately laying a metal magnetic thin film and a non-magnetic film by the vacuum deposition method. The metal thin film tape having the response represented by the curve B has a high output level in the high frequency range but its output level is about 7 to 8 dB lower than that of the iron oxide type tape represented by the curve A in the mid range of 100 Hz to 1 KHz. The magnetic tape disclosed in Japanese Patent Disclosure No. 143113/79 has the frequency response corresponding to the combination of the curves A and B and therefore a good MOL over the mid and high frequency ranges. As described above, a tape of the type in which the magnetic member layer which does not contain a binder slidably contacts the magnetic head, the corrosion resistance and the wear resistance is poor because it has no protective layer.

The curve C in FIG. 3 represents the frequency response of the magnetic tape of the embodiment of the present invention shown in FIG. 1. As shown, the characteristic of the curve C is a good combination of the curve A representing the advantage of the iron oxide type tape, or the high MOL over the low and mid frequency ranges, and the curve B representing the advantage of the metal thin film tape, or the high MOL in the high frequency. When considering only such MOL characteristic, even the magnetic tape disclosed in the Japanese Patent Disclosure No. 143113/79 may obtain the characteristic as shown by the curve C. The magnetic tape of the prior art, however, has still probelms as mentioned above such as wear resistance. According to the present invention, there is provided a magnetic tape, or the magnetic recording medium, which is mechanically and chemically stable, having the improved characteristic shown by the curve C.

Turning now to FIG. 4, there is shown a modification of the embodiment shown in FIG. 1. In the present embodiment, a fourth magnetic layer 18 is formed on the reverse side of the base film 10, that is, the surface opposite to that on which the first to third magnetic layers 12 to 16 are formed. The magnetic layer 18 is formed by coating a magnetic fine grain alloy of high energy and high permeability, for example, Fe, Co or the like, together with an organic binder. Said magnetic layer 18 includes a metal element (Fe, Co, Ni) of the group VIII of the Periodic Table or an alloy including a metal element selected from the group VIII element.

The thickness t5 of the fourth magnetic layer 18 is selected to be about 1 μm, for example, although it is changeable in accordance with the thickness t1 of the base film 10, and the thicknesses t2 to t4 and the coercive force of the first to third magnetic layers. The fourth magnetic layer 18 is operable like the back coat of the known back coating type tape and further effectively reduces particularly the transfer effect in the reel take-up type magnetic tape. In other words, even if the recorded magnetic tape with the construction shown in FIG. 4 is left for a long time, there will not occur an adverse effect where the recording magnetic field of the first to third magnetic layers (not shown) right under the fourth magnetic layer 18 acts on the first magnetic layer 12 through the film 10 and the recorded contents of the magnetic layer just under it is transferred to the first magnetic layer 12 as if it were a ghost signal.

In addition, the magnetic layers 12, 16 and 18 in the present invention are formed by the same type coating process using the binder, with the result that the manufacturing process is not complicated.

The embodiments of the invention disclosed and illustrated in the specification and drawings do not limit the present invention and therefore the present invention may be variously changed and modified within the scope and spirit as defined by the appended claims. For example, the materials and the thicknesses of the base film and the magnetic layers are not limited to those described in the above-mentioned embodiments. The present invention is applicable for magnetic discs, magnetic cards, magnetic sheets and other proper magnetic recording mediums, in addition to the magnetic tapes.

What is claimed is:

1. A ferromagnetic recording medium comprising:
   a base;
   a first magnetic layer which includes ferromagnetic material formed on said base;
   a second ferromagnetic layer which includes a fine grain metal which is ferromagnetic and which does not contain a binder formed on said first ferromagnetic layer, said second ferromagnetic layer being a thin layer which has a rough surface; and
   a third ferromagnetic layer having a smooth outer surface formed on said second ferromagnetic layer, said third ferromagnetic layer includes ferromagnetic material admixed with a binder which is formed of a synthetic resin and has a predetermined average thickness between 0.3 and 1 micron and sufficient to cover all of the rough surface of said second ferromagnetic layer and functions as a protective layer for said second magnetic layer.

2. A recording medium according to claim 1, wherein said first magnetic layer includes magnetic material admixed with a binder.

3. A recording medium according to claim 1, wherein said second magnetic layer includes metal magnetic material and said third magnetic layer includes metal oxide magnetic material.

4. A recording medium according to claim 2, wherein said second magnetic layer consists essentially of metal magnetic material and said third magnetic layer consists essentially of metal oxide magnetic material.

5. A recording medium according to claim 3, wherein said first magnetic layer consists essentially of metal oxide magnetic material.

6. A recording medium according to claim 4, wherein said first magnetic layer consists essentially of metal oxide magnetic material.

7. A recording medium according to claim 5, wherein said first and third magnetic layers consist essentially of gamma hematite ($\gamma-Fe_2O_3$).

8. A recording medium according to claim 6, wherein said first and third magnetic layers consist essentially of gamma hematite ($\gamma-Fe_2O_3$).

9. A recording medium according to claim 1, wherein said second magnetic layer consists essentially or iron, cobalt or nickel and alloys thereof.

10. A recording medium according to claim 2, wherein said second magnetic layer consists essentially of iron, cobalt or nickel and alloys thereof.

11. A recording medium according to claim 3, wherein said second magnetic layer consists essentially of iron, cobalt or nickel and alloys thereof.

12. A recording medium according to claim 4, wherein said second magnetic layer consists essentially of iron, cobalt or nickel and alloys thereof.

13. A recording medium according to claim 5, wherein said second magnetic layer consists essentially of iron, cobalt or nickel and alloys thereof.

14. A recording medium according to claim 6, wherein said second magnetic layer consists essentially of iron, cobalt or nickel and alloys thereof.

15. A recording medium according to claim 7, wherein said second magnetic layer consists essentially of iron, cobalt or nickel and alloys thereof.

16. A recording medium according to claim 8, wherein said second magnetic layer consists essentially of iron, cobalt or nickel and alloys thereof.

17. A recording medium according of claim 1, wherein said base is a nonmagnetic film.

18. A recording medium according of claim 2, wherein said base is a nonmagnetic film.

19. A recording medium according of claim 3, wherein said base is a nonmagnetic film.

20. A recording medium according of claim 4, wherein said base is a nonmagnetic film.

21. A recording medium according of claim 5, wherein said base is a nonmagnetic film.

22. A recording medium according of claim 6, wherein said base is a nonmagnetic film.

23. A recording medium according of claim 7, wherein said base is a nonmagnetic film.

24. A recording medium according of claim 8, wherein said base is a nonmagnetic film.

25. A recording medium according of claim 9, wherein said base is a nonmagnetic film.

26. A recording medium according of claim 17, wherein the thickness of said film is larger than the thickness of said first magnetic layer, and the thickness of said second or third magnetic layer is substantially equal to that of said first magnetic layer or smaller than the thickness of said first magnetic layer.

27. A recording medium according of claim 18, wherein the thickness of said film is larger than the thickness of said first magnetic layer, and the thickness of said second or third magnetic layer is substantially equal to that of said first magnetic layer or smaller than the thickness of said first magnetic layer.

28. A recording medium according of claim 19, wherein the thickness of said film is larger than the thickness of said first magnetic layer, and the thickness of said second or third magnetic layer is substantially equal to that of said first magnetic layer or smaller than the thickness of said first magnetic layer.

29. A recording medium according of claim 20, wherein the thickness of said film is larger than the thickness of said first magnetic layer, and the thickness of said second or third magnetic layer is substantially equal to that of said first magnetic layer or smaller than the thickness of said first magnetic layer.

30. A recording medium according of claim 21, wherein the thickness of said film is larger than the thickness of said first magnetic layer, and the thickness of said second or third magnetic layer is substantially equal to that of said first magnetic layer or smaller than the thickness of said first magnetic layer.

31. A recording medium according of claim 22, wherein the thickness of said film is larger than the thickness of said first magnetic layer, and the thickness of said second or third magnetic layer is substantially equal to that of said first magnetic layer or smaller than the thickness of said first magnetic layer.

32. A recording medium according of claim 23, wherein the thickness of said film is larger than the thickness of said first magnetic layer, and the thickness of said second or third magnetic layer is substantially equal to that of said first magnetic layer or smaller than the thickness of said first magnetic layer.

33. A recording medium according of claim 24, wherein the thickness of said film is larger than the thickness of said first magnetic layer, and the thickness of said second or third magnetic layer is substantially equal to that of said first magnetic layer or smaller than the thickness of said first magnetic layer.

34. A recording medium according of claim 25, wherein the thickness of said film is larger than the thickness of said first magnetic layer, and the thickness of said second or third magnetic layer is substantially equal to that of said first magnetic layer or smaller than the thickness of said first magnetic layer.

35. A recording medium according to claim 1, wherein the thickness of said third magnetic layer is about 0.3 $\mu$m to about 0.5 $\mu$m.

36. A recording medium according of claim 2, wherein the thickness of said third magnetic layer is about 0.3 $\mu$m to about 0.5 $\mu$m.

37. A recording medium according of claim 3, wherein the thickness of said third magnetic layer is about 0.3 $\mu$m to about 0.5 $\mu$m.

38. A recording medium according of claim 4, wherein the thickness of said third magnetic layer is about 0.3 $\mu$m to about 0.5 $\mu$m.

39. A recording medium according of claim 5, wherein the thickness of said third magnetic layer is about 0.3 $\mu$m to about 0.5 $\mu$m.

40. A recording medium according of claim 6, wherein the thickness of said third magnetic layer is about 0.3 $\mu$m to about 0.5 $\mu$m.

41. A recording medium according of claim 7, wherein the thickness of said third magnetic layer is about 0.3 $\mu$m to about 0.5 $\mu$m.

42. A recording medium according of claim 8, wherein the thickness of said third magnetic layer is about 0.3 $\mu$m to about 0.5 $\mu$m.

43. A recording medium according of claim 9, wherein the thickness of said third magnetic layer is about 0.3 $\mu$m to about 0.5 $\mu$m.

44. A recording medium according of claim 17, wherein the thickness of said third magnetic layer is about 0.3 $\mu$m to about 0.5 $\mu$m.

45. A recording medium according of claim 26, wherein the thickness of said third magnetic layer is about 0.3 $\mu$m to about 0.5 $\mu$m.

46. A ferromagnetic recording medium according to claim 1, wherein a fourth magnetic layer is formed on the surface of said base which is the reverse side of the surface on which said first to third magnetic layers are formed.

47. A recording medium according of claim 2, wherein a fourth magnetic layer is formed on the surface of said base which is the reverse side of the surface on which said first to third magnetic layers are formed.

48. A recording medium according of claim 3, wherein a fourth magnetic layer is formed on the surface of said base which is the reverse side of the surface on which said first to third magnetic layers are formed.

49. A recording medium according of claim 4, wherein a fourth magnetic layer is formed on the surface of said base which is the reverse side of the surface on which said first to third magnetic layers are formed.

50. A recording medium according of claim 5, wherein a fourth magnetic layer is formed on the surface of said base which is the reverse side of the surface on which said first to third magnetic layers are formed.

51. A recording medium according of claim 6, wherein a fourth magnetic layer is formed on the surface of said base which is the reverse side of the surface on which said first to third magnetic layers are formed.

52. A recording medium according of claim 7, wherein a fourth magnetic layer is formed on the surface of said base which is the reverse side of the surface on which said first to third magnetic layers are formed.

53. A recording medium according of claim 8, wherein a fourth magnetic layer is formed on the surface of said base which is the reverse side of the surface on which said first to third magnetic layers are formed.

54. A recording medium according of claim 9, wherein a fourth magnetic layer is formed on the surface of said base which is the reverse side of the surface on which said first to third magnetic layers are formed.

55. A recording medium according of claim 17, wherein a fourth magnetic layer is formed on the surface of said base which is the reverse side of the surface on which said first to third magnetic layers are formed.

56. A recording medium according of claim 26, wherein a forth magnetic layer is formed on the surface of said base which is the reverse side of the surface on which said first to third magnetic layers are formed.

57. A recording medium according of claim 35, wherein a fourth magnetic layer is formed on the surface of said base which is the reverse side of the surface on which said first to third magnetic layers are formed.

58. A recording medium according to claim 46, wherein said fourth magnetic layer has a larger coercive force than that of said first magnetic layer.

59. A recording medium according of claim 47, wherein said fourth magnetic layer has a larger coercive force than that of said first magnetic layer.

60. A recording medium according of claim 48, wherein said fourth magnetic layer has a larger coercive force than that of said first magnetic layer.

61. A recording medium according of claim 49, wherein said fourth magnetic layer has a larger coercive force than that of said first magnetic layer.

62. A recording medium according of claim 50, wherein said fourth magnetic layer has a larger coercive force than that of said first magnetic layer.

63. A recording medium according of claim 51, wherein said fourth magnetic layer has a larger coercive force than that of said first magnetic layer.

64. A recording medium according of claim 52, wherein said fourth magnetic layer has a larger coercive force than that of said first magnetic layer.

65. A recording medium according of claim 53, wherein said fourth magnetic layer has a larger coercive force than that of said first magnetic layer.

66. A recording medium according of claim 54, wherein said fourth magnetic layer has a larger coercive force than that of said first magnetic layer.

67. A recording medium according of claim 55, wherein said fourth magnetic layer has a larger coercive force than that of said first magnetic layer.

68. A recording medium according of claim 56, wherein said fourth magnetic layer has a larger coercive force than that of said first magnetic layer.

69. A recording medium according of claim 57, wherein said fourth magnetic layer has a larger coercive force than that of said first magnetic layer.

70. A recording medium according to claim 46, wherein said fourth magnetic layer consists essentially of iron, cobalt or nickel and alloys thereof.

71. A recording medium according to claim 47, wherein said fourth magnetic layer consists essentially of iron, cobalt or nickel and alloys thereof.

72. A recording medium according to claim 48, wherein said fourth magnetic layer consists essentially of iron, cobalt or nickel and alloys thereof.

73. A recording medium according to claim 49, wherein said fourth magnetic layer consists essentially of iron, cobalt or nickel and alloys thereof.

74. A recording medium according to claim 50, wherein said fourth magnetic layer consists essentially of iron, cobalt or nickel and alloys thereof.

75. A recording medium according to claim 51, wherein said fourth magnetic layer consists essentially of iron, cobalt or nickel and alloys thereof.

76. A recording medium according to claim 52, wherein said fourth magnetic layer consists essentially of iron, cobalt or nickel and alloys thereof.

77. A recording medium according to claim 53, wherein said fourth magnetic layer consists essentially of iron, cobalt or nickel and alloys thereof.

78. A recording medium according to claim 54, wherein said fourth magnetic layer consists essentially of iron, cobalt or nickel and alloys thereof.

79. A recording medium according to claim 55, wherein said fourth magnetic layer consists essentially of iron, cobalt or nickel and alloys thereof.

80. A recording medium according to claim 56, wherein said fourth magnetic layer consists essentially of iron, cobalt or nickel and alloys thereof.

81. A recording medium according to claim 57, wherein said fourth magnetic layer consists essentially of iron, cobalt or nickel and alloys thereof.

82. A recording medium according to claim 58, wherein said fourth magnetic layer consists essentially of iron, cobalt or nickel and alloys thereof.

83. A recording medium according to claim 59, wherein said fourth magnetic layer consists essentially of iron, cobalt or nickel and alloys thereof.

84. A recording medium according to claim 60, wherein said fourth magnetic layer consists essentially of iron, cobalt or nickel and alloys thereof.

85. A recording medium according to claim 61, wherein said fourth magnetic layer consists essentially of iron, cobalt or nickel and alloys thereof.

86. A recording medium according to claim 62, wherein said fourth magnetic layer consists essentially of iron, cobalt or nickel and alloys thereof.

87. A recording medium according to claim 63, wherein said fourth magnetic layer consists essentially of iron, cobalt or nickel and alloys thereof.

88. A recording medium according to claim 64, wherein said fourth magnetic layer consists essentially of iron, cobalt or nickel and alloys thereof.

89. A recording medium according to claim 65, wherein said fourth magnetic layer consists essentially of iron, cobalt or nickel and alloys thereof.

90. A recording medium according to claim 66, wherein said fourth magnetic layer consists essentially of iron, cobalt or nickel and alloys thereof.

91. A recording medium according to claim 67, wherein said fourth magnetic layer consists essentially of iron, cobalt or nickel and alloys thereof.

92. A recording medium according to claim 68, wherein said fourth magnetic layer consists essentially of iron, cobalt or nickel and alloys thereof.

93. A recording medium according to claim 69, wherein said fourth magnetic layer consists essentially of iron, cobalt or nickel and alloys thereof.

* * * * *

UNITED STATES PATENT AND TRADEMARK OFFICE
CERTIFICATE OF CORRECTION

PATENT NO. : 4,410,583
DATED : October 18, 1983
INVENTOR(S) : Naohiro HANAOKA

It is certified that error appears in the above-identified patent and that said Letters Patent is hereby corrected as shown below:

Column 8, (Claim 46), line 10, delete "ferromagnetic" and
    line 11, delete "magnetic" and insert --ferromagnetic--.

Signed and Sealed this

Seventh Day of May 1985

[SEAL]

Attest:

DONALD J. QUIGG

Attesting Officer    Acting Commissioner of Patents and Trademarks